(12) United States Patent
Heller et al.

(10) Patent No.: US 9,470,186 B2
(45) Date of Patent: Oct. 18, 2016

(54) METHOD FOR DIAGNOSING A TANK VENTILATION SYSTEM

(75) Inventors: Friedemann Heller, Beilstein (DE);
Michael Senger, Freudental (DE);
Philip Heuser, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 410 days.

(21) Appl. No.: 14/343,256

(22) PCT Filed: Aug. 6, 2012

(86) PCT No.: PCT/EP2012/065313
§ 371 (c)(1),
(2), (4) Date: Jun. 19, 2014

(87) PCT Pub. No.: WO2013/034380
PCT Pub. Date: Mar. 14, 2013

(65) Prior Publication Data
US 2014/0299110 A1    Oct. 9, 2014

(30) Foreign Application Priority Data

Sep. 9, 2011    (DE) .................. 10 2011 082 439

(51) Int. Cl.
| | | |
|---|---|---|
| F02M 25/08 | (2006.01) | |
| F02D 41/00 | (2006.01) | |
| G01M 15/09 | (2006.01) | |

(52) U.S. Cl.
CPC ...... *F02M 25/0827* (2013.01); *F02D 41/0042* (2013.01); *F02D 41/0045* (2013.01); *F02M 25/08* (2013.01); *F02M 25/0809* (2013.01); *F02M 25/0872* (2013.01); *G01M 15/09* (2013.01)

(58) Field of Classification Search
CPC ............... F02M 25/0809; F02M 25/0827; F02M 25/0872
See application file for complete search history.

(56) References Cited

U.S. PATENT DOCUMENTS

| | | | |
|---|---|---|---|
| 9,359,978 B2 * | 6/2016 | Balsdon | F02M 25/0872 |
| 2006/0243258 A1 | 11/2006 | Withrow et al. | |
| 2011/0146391 A1 | 6/2011 | Jach et al. | |
| 2014/0026865 A1 * | 1/2014 | Dudar | F02M 25/0818 123/518 |

(Continued)

FOREIGN PATENT DOCUMENTS

| | | |
|---|---|---|
| CN | 101900040 A | 12/2010 |
| CN | 102400820 A | 4/2012 |

(Continued)

OTHER PUBLICATIONS

International Search Report for PCT/EP2013/065313, dated Dec. 21, 2012.

*Primary Examiner* — Erick Solis
(74) *Attorney, Agent, or Firm* — Norton Rose Fulbright US LLP

(57) ABSTRACT

In an internal combustion engine having a turbocharger and a compressor, a discharge point of a tank ventilation system is provided in the intake passage of the internal combustion engine upstream from the turbocharger or the compressor. A Venturi nozzle is situated between the discharge point and a tank venting valve of the tank ventilation system. A defect or a detachment of the line between the Venturi nozzle and the discharge point is detectable with the aid of a change of an adaption value and/or of a correction factor in a control unit of the internal combustion engine or in a computer.

10 Claims, 1 Drawing Sheet

(56) References Cited

U.S. PATENT DOCUMENTS

| | | | | |
|---|---|---|---|---|
| 2014/0196694 A1* | 7/2014 | Euliss | ............... | F02M 25/08 123/520 |
| 2014/0345573 A1* | 11/2014 | Jefford | ............... | F02M 25/0836 123/519 |
| 2015/0096541 A1* | 4/2015 | Edmund | ............... | F02M 25/0872 123/520 |
| 2015/0176542 A1* | 6/2015 | Balsdon | ............... | F02M 25/0836 137/888 |
| 2015/0275826 A1* | 10/2015 | Balsdon | ............... | F02M 25/0836 123/518 |

FOREIGN PATENT DOCUMENTS

| | | |
|---|---|---|
| DE | 10 2005 045434 | 3/2007 |
| WO | WO 2009/037150 | 3/2009 |

\* cited by examiner

METHOD FOR DIAGNOSING A TANK VENTILATION SYSTEM

BACKGROUND OF THE INVENTION

1. Field of the Invention

The present invention relates to a method for diagnosing a tank ventilation system of an internal combustion engine which includes a turbocharger and a compressor. The present invention further relates to a computer program which carries out all steps of the method according to the present invention if it runs on a computer. Finally, the present invention relates to a computer program product which has program code and is stored on a machine-readable medium for carrying out the method according to the present invention if the program runs on a computer or a control unit.

2. Description of the Related Art

Legislation requires fuel vapors, which are generated in the fuel tank of a motor vehicle, in particular of a motor vehicle having a gasoline engine, as a result of outgassing, to be stored on an intermediate basis in order to supply them thereafter to the combustion process in an internal combustion engine. An activated carbon container is used for intermediate storage. However, this container must be purged while the motor vehicle is being driven due to its limited storage capacity. Fresh air is conducted through the activated carbon container for this purpose, the stored fuel vapors are desorbed, and the resulting fuel/air mixture is supplied to the combustion process in a targeted manner. This entire process is based on a pressure gradient between the surroundings and the intake passage of the internal combustion engine. Purging of the activated carbon container may thus only take place when such a pressure gradient is present between the surroundings and the intake passage. However, this pressure gradient exists only very conditionally in the lower partial load operation in supercharged internal combustion engines or an internal combustion engine having compressors. To be able to ensure sufficient regeneration of the activated carbon container in driving mode for these engine concepts as well, so-called Venturi systems were introduced, which are also able to generate a negative pressure during supercharged operation due to a bypass line in a Venturi nozzle, which may then be used for purging the activated carbon container.

Such a tank ventilation system is shown in FIG. 1 for a supercharged internal combustion engine. An activated carbon container 11 is connected to a tank venting valve 12. Two lines 13, 14 branch off tank venting valve 12 to introduce the fuel/air mixture into intake passage 16 of an internal combustion engine 17. First line 13 includes a non-return valve 131 and ends at a discharge point 132 between internal combustion engine 17 and a throttle valve 164 in intake passage 16. Second line 14 includes a non-return valve 141 and ends in Venturi nozzle 151. A connecting line 15, which ends at a second discharge point 152 in intake passage 16 between an air filter 161 and a turbocharger 162, extends from the Venturi nozzle. Between a charge air cooler 163 and throttle valve 164, intake passage 16 branches into a first part, which ends in Venturi nozzle 151, and a second part, which ends in internal combustion engine 17.

In the United States of America, legislation also requires the systems for regenerating activated carbon container 11 to be monitored for functional capability. In addition to tank venting valve 12, these systems also include the tubing, i.e., line system 13, 14, 15, which is used to transport the fuel/air mixture. As a result, defects within the entire system must be detected. The diagnostic function used for this purpose is based on a negative pressure which develops in the fuel tank when tank venting valve 12 is opened. If valve 12 cannot be opened or a defect exists in the line system, no negative pressure forms in the tank and the system is detected as being defective.

Since this diagnostic principle is based on negative pressure, only parts 13, 14 of the line system in which in fact a negative pressure is present are diagnosable. If a defect exists in the line system at connection 15 between Venturi nozzle 151 and discharge point 152, a negative pressure forms in Venturi nozzle 151, and thus also in the tank system, despite the defect. The system is thus not detected as being defective, even though a defect exists and the fuel/air mixture is given off to the surroundings as hydrocarbon emissions. Since discharge point 152 in intake passage 16 is located upstream from turbocharger 162, but downstream from an air mass flow sensor (hot film anemometer (HFM); not shown) of internal combustion engine 17, air which was not detected by the air mass flow sensor may additionally reach the air supply system of the internal combustion engine through a defective or detached connecting line 15. As a result, the design specification exists that connecting line 15 must be inseparably connected to Venturi nozzle 151 and discharge point 152 between air filter 161 and turbocharger 162 and must also be designed to be "indestructible." These specifications may not always be possible to adhere to, among other things for packing reasons.

BRIEF SUMMARY OF THE INVENTION

The method according to the present invention for diagnosing a tank ventilation system of an internal combustion engine which includes a turbocharger and a compressor, a discharge point of the tank ventilation system being situated in the intake passage of the internal combustion engine upstream from the turbocharger and the compressor, and a Venturi nozzle being situated between the discharge point and a tank venting valve of the tank ventilation system, provides that a defect (i.e., in particular a leak) and/or a detachment of the line between the Venturi nozzle and the discharge point is/are detected with the aid of the change of at least one adaption value and/or of one correction factor in the control unit of the internal combustion engine or in a computer. The at least one adaption value and/or correction factor is/are in particular an adaption value and/or correction factor which adapts and/or corrects the fuel mixture formation of the internal combustion engine. According to the present invention, this also allows a defect to be detected in the portion of the line system of the tank ventilation system in which no negative pressure is present. When such a diagnosis is possible, it is no longer necessary to connect the connecting line inseparably to the Venturi nozzle and to the discharge point between the air filter and the turbocharger or the compressor, which makes more degrees of freedom available in the design and manufacture of the tank ventilation system. The connecting line also no longer must be designed to be "indestructible." Since adaption values and/or correction factors may be utilized which must be ascertained anyhow for operating the internal combustion engine, the method according to the present invention is easy to implement on an existing internal combustion engine.

According to the present invention, the adaption value and/or correction factor is/are stored in particular in the control unit or the computer, and a defect and/or a detachment of the line between the Venturi nozzle and the discharge point is/are detected with the aid of a change of the adaption value and/or of the correction factor by a defined value between two operating cycles of the internal combustion engine. This is implemented according to the present invention in particular by determining a first adaption value and/or a first correction factor during the operation of the internal combustion engine and by storing the first adaption value and/or the first correction factor in the control unit or the computer when the internal combustion engine is shut off. During the renewed operation of the internal combustion engine, a second adaption value and/or correction factor is/are determined, and a defect and/or a detachment of the line between the Venturi nozzle and the discharge point is/are detected when the second adaption value and/or correction factor differ(s) from the first adaption value and/or correction factor by at least one defined value.

According to the present invention, different adaption values or correction factors are suitable for diagnosing the tank ventilation system. For example, an adaption value $A_m$ for the multiplicative mixture correction may be used. Moreover, an adaption value $A_s$ for the additive mixture correction may be used. Additionally, a correction factor K for the mass flow rate adjustment via the throttle valve in the intake passage of the internal combustion engine may be used. Finally, an adaption value $A_s$ for the conversion of the intake manifold pressure into a charge may be used. According to the present invention, it is particularly preferred to check multiple of these values for deviations in the method according to the present invention to detect a defect and/or a detachment of the line between the Venturi nozzle and the discharge point with particularly high certainty, wherein a fault detection is carried out when deviations in all checked values exist.

According to the present invention, the values by which one adaption value and/or one correction factor must at least change may be stored in the control unit or in the computer, so that a fault in the connecting line between the Venturi nozzle and the discharge point into the intake passage is detected. These are in particular:

- a value $\Delta A_m$ by which a first adaption value $A_{m1}$ for the multiplicative mixture correction must differ from a second adaption value $A_{m2}$ for the multiplicative mixture correction so that a fault is detected;
- a value $\Delta A_a$ by which a first adaption value $A_{a1}$ for the additive mixture correction must differ from a second adaption value $A_{a2}$ for the additive mixture correction so that a fault is detected;
- a value $\Delta K$ by which a first correction factor $K_1$ for the mass flow rate adjustment via a throttle valve in the intake passage of the internal combustion engine must differ from a second correction factor $K_2$ for the mass flow rate adjustment via a throttle valve in the intake passage of the internal combustion engine so that a fault is detected; and
- a value $\Delta A_s$ by which a first adaption value $A_{s1}$ for the conversion of the intake manifold pressure into a charge must differ from a second adaption value $A_{s2}$ for the conversion of the intake manifold pressure into a charge so that a fault is detected.

The method according to the present invention also makes it possible to detect when a previously detected defect and/or a detachment of the line between the Venturi nozzle and the discharge point is eliminated between two operating cycles of the internal combustion engine (fault remedying).

A computer program may carry out all steps of the diagnostic method according to the present invention if it runs on a computer. A computer program product which has a program code and is stored on a machine-readable medium makes it possible to carry out the method according to the present invention if the program runs on a computer or a control unit. The method according to the present invention may thus be easily implemented in the control unit of an internal combustion engine.

DETAILED DESCRIPTION OF THE DRAWINGS

Figure 1:
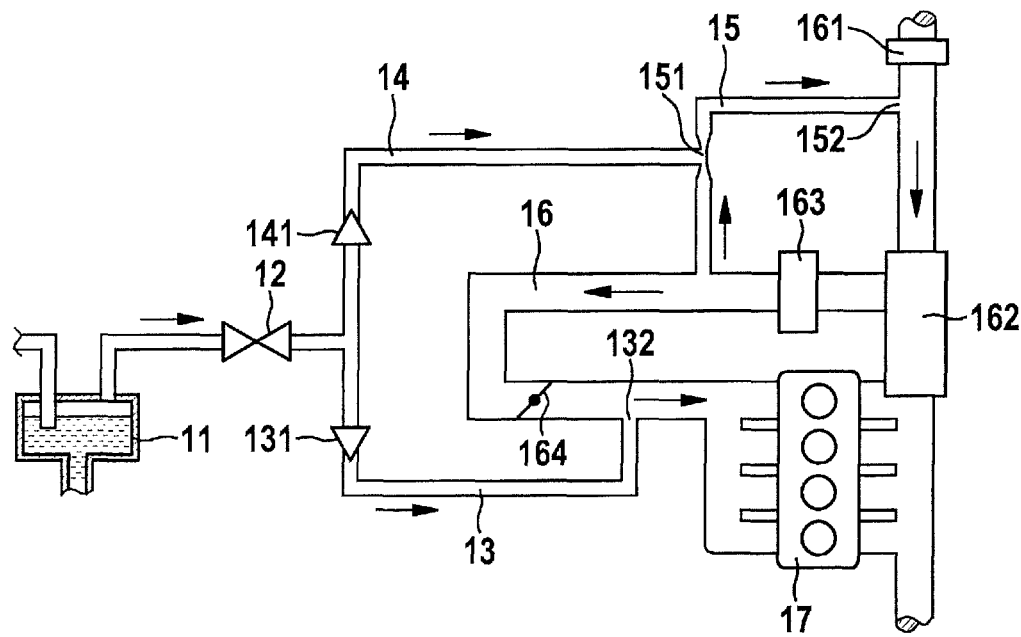
FIG. 1 shows a tank ventilation system of a supercharged gasoline engine according to the related art.
Figure 2:
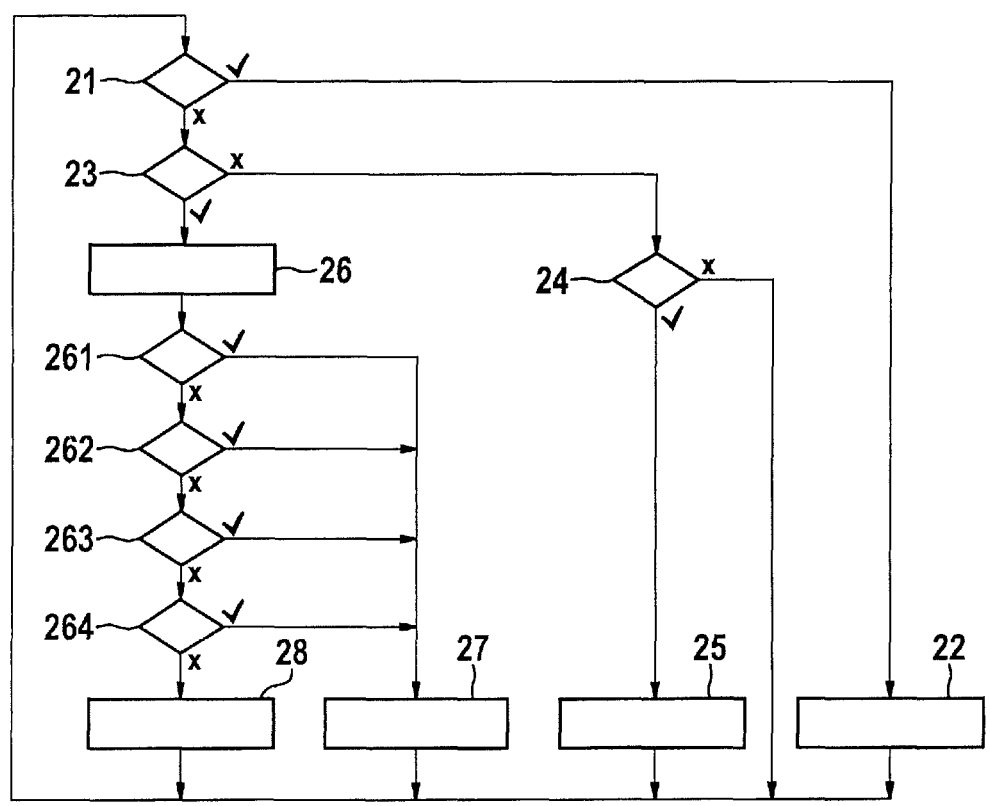
FIG. 2 shows a schematic diagram of one specific embodiment of the method according to the present invention for diagnosing a tank ventilation system.

FIG. 2 shows a schematic diagram of one specific embodiment of the method according to the present invention for diagnosing a tank ventilation system as it is shown in FIG. 1. In the first method step 21, it is initially checked in the control unit of internal combustion engine 17 whether an initialization of the control unit takes place. If such an initialization is carried out, data about an adaption value $A_{m1}$ for the multiplicative mixture correction, an adaption value $A_{a1}$ for the additive mixture correction, a correction factor $K_1$ for the mass flow rate adjustment via a throttle valve 164 in intake passage 16 of internal combustion engine 17, and an adaption value $A_{s1}$ for the conversion of the intake manifold pressure into a charge of the last operating cycle of internal combustion engine 17 are read in from an E²PROM into the control unit in a method step 22. If the initialization has already been completed, it is checked in next method step 23 whether internal combustion engine 17 is in driving mode. If this is not the case, it is checked in a further step 24 whether a shut-off of internal combustion engine 17 is taking place. When internal combustion engine 17 is shut off, an adaption value $A_{m1}$ for the multiplicative mixture correction, an adaption value $A_{a1}$ for the additive mixture correction, a correction factor $K_1$ for the mass flow rate adjustment via a throttle valve in the intake passage, and an adaption value $A_{s1}$ for the conversion of the intake manifold pressure into a charge are stored in the E²PROM in a method step 25 and replace the previously stored values $A_{m1}$, $A_{a1}$, $K_1$ and $A_{s1}$ there. As soon as a driving mode is detected, a value range monitoring 26 begins. In a first monitoring step 261, instantaneous adaption value $A_{m2}$ for the multiplicative mixture correction is compared to adaption value $A_{m1}$ for the multiplicative mixture correction which was read out from the E²PROM. If these values do not differ from each other by at least a defined value $\Delta A_m$, it is established in a further method step 27 that connecting line 15 is free of faults. Otherwise, instantaneous adaption value $A_{a2}$ for the adaptive mixture correction is compared to adaption value $A_{a1}$ for the adaptive mixture correction which was read out from the E²PROM in a second monitoring step 262. If these values do not differ from each other by at least a defined value $\Delta A_a$, it is established in further method step 27 that connecting line 15 is free of faults. Otherwise, instantaneous correction factor $K_2$ for the mass flow rate adjustment via a throttle valve 164 in intake passage 16 of internal combustion engine 17 is compared to correction factor $K_1$ for the mass flow rate adjustment which was read out from the E²PROM in a third monitoring step 263. If these correction values do not differ from each other by at least a defined value $\Delta K$, it is established in further method step 27 that connecting line 15 is free of faults. Otherwise, instantaneous adaption value $A_{s2}$ for the conversion of the intake manifold pressure into a charge is compared to adaption value $A_{s1}$ for the conversion of the intake manifold pressure into a charge which was read out from the E²PROM in a fourth monitoring step 264. If these data do not differ from each other by at least a predefined value $\Delta A_s$, it is established in further method step 27 that connecting line 15 is free of faults. If a deviation of the monitored adaption value or correction factor by at least the assigned defined value ($\Delta A_m$, $\Delta A_a$, $\Delta K$ or $\Delta A_s$) was not detected in each of the four monitoring steps 261, 262, 263, 264, it is established in method step 27 that connecting line 15 is free of faults. The detection of a deviation of all monitored adaption values or correction factors by at least the assigned defined value ($\Delta A_m$, $\Delta A_a$, $\Delta K$ or $\Delta A_s$) results in a fault entry in the on-board diagnosis (OBD) of internal combustion engine 17 in method step 28. The diagnostic method according to the present invention is continued until internal combustion engine 17 is shut off. If a fault entry has been made in the OBD, and it is established after reactivating internal combustion engine 17 that connecting line 15 is again free of faults, for example because a repair was made to the connecting line, this is also noted in the OBD.

All steps of the diagnostic method according to the present invention may be carried out, for example, by a computer program which runs on the control unit of internal combustion engine 17.

What is claimed is:

1. A method for diagnosing a tank ventilation system of an internal combustion engine which includes one of a turbocharger or a compressor, a discharge point of the tank ventilation system being situated in an intake passage of the internal combustion engine upstream from the one of the turbocharger or the compressor, and a Venturi nozzle being situated between the discharge point and a tank venting valve of the tank ventilation system, the method comprising:
    detecting at least one of a defect and a detachment of a connecting line between the Venturi nozzle and the discharge point with the aid of a change of at least one of an adaption value and a correction factor in one of a control unit of the internal combustion engine or a computer.

2. The method as recited in claim 1, wherein the adaption value adapts a fuel mixture formation of the internal combustion engine and the correction factor corrects the fuel mixture formation of the internal combustion engine.

3. The method as recited in claim 2, wherein:
    the at least one of the adaption value and the correction factor is stored in one of the control unit or the computer; and
    the at least one of the defect and the detachment of the connecting line between the Venturi nozzle and the discharge point is detected with the aid of a change of the at least one of the adaption value and the correction factor by a defined value between two operating cycles of the internal combustion engine.

4. The method as recited in claim 3, wherein:
    a first adaption value for a multiplicative mixture correction is determined during operation of the internal combustion engine;
    the first adaption value is stored in one of the control unit or the computer when the internal combustion engine is shut off;
    a second adaption value for the multiplicative mixture correction is determined during renewed operation of the internal combustion engine; and
    the at least one of the defect and the detachment of the connecting line between the Venturi nozzle and the discharge point is detected when the second adaption value differs from the first adaption value by at least one predefined value.

5. The method as recited in claim 3, wherein:
    a first adaption value for an additive correction is determined during operation of the internal combustion engine;
    the first adaption value is stored in one of the control unit or the computer when the internal combustion engine is shut off;
    a second adaption value for the additive mixture correction is determined during renewed operation of the internal combustion engine; and
    the at least one of the defect and the detachment of the connecting line between the Venturi nozzle and the discharge point is detected when the second adaption value differs from the first adaption value by at least one predefined value.

6. The method as recited in claim 3, wherein:
    a first correction factor for a mass flow rate adjustment via a throttle valve in the intake passage of the internal combustion engine is determined during operation of the internal combustion engine;
    the first correction factor is stored in one of the control unit or the computer when the internal combustion engine is shut off;
    a second correction factor for the mass flow rate adjustment via the throttle valve is determined during renewed operation of the internal combustion engine; and
    the at least one of the defect and the detachment of the connecting line between the Venturi nozzle and the discharge point is detected when the second correction factor differs from the first correction factor by at least one predefined value.

7. The method as recited in claim 3, wherein:
    a first adaption value for a conversion of an intake manifold pressure into a charge is determined during operation of the internal combustion engine;
    the first adaption value is stored in one of the control unit or the computer when the internal combustion engine is shut off;
    a second adaption value for the conversion of the intake manifold pressure into a charge is determined during renewed operation of the internal combustion engine; and
    the at least one of the defect and the detachment of the connecting line between the Venturi nozzle and the discharge point is detected when the second adaption value differs from the first adaption value by at least one predefined value.

8. The method as recited in claim 3, wherein the at least one of the defect and the detachment of the connecting line between the Venturi nozzle and the discharge point is detected when a change of the at least one of the adaption value and the correction factor exceeds the at least one of the adaption value and the correction factor.

9. A non-transitory computer-readable data storage medium storing a computer program having program codes which, when executed on a computer, performs a method for diagnosing a tank ventilation system of an internal combustion engine which includes one of a turbocharger or a compressor, a discharge point of the tank ventilation system being situated in an intake passage of the internal combustion engine upstream from the one of the turbocharger or the compressor, and a Venturi nozzle being situated between the discharge point and a tank venting valve of the tank ventilation system, the method comprising:

detecting at least one of a defect and a detachment of a connecting line between the Venturi nozzle and the discharge point with the aid of a change of at least one of an adaption value and a correction factor in one of a control unit of the internal combustion engine or a computer.

10. A tank ventilation system of an internal combustion engine having one of a turbocharger or a compressor, comprising:

a discharge point of the tank ventilation system situated in an intake passage of the internal combustion engine upstream from the one of the turbocharger or the compressor;

a Venturi nozzle situated between the discharge point and a tank venting valve of the tank ventilation system; and a control unit detecting at least one of a defect and a detachment of a connecting line between the Venturi nozzle and the discharge point with the aid of a change of at least one of an adaption value and a correction factor.

\* \* \* \* \*